US008768316B2

(12) United States Patent
Andrus, Jr. et al.

(10) Patent No.: US 8,768,316 B2
(45) Date of Patent: *Jul. 1, 2014

(54) CUSTOMIZABLE KEYPRESS TONES AND METHOD OF INSTALLING

(71) Applicant: AT&T Mobility II LLC, Atlanta, GA (US)

(72) Inventors: Scott Andrus, Jr., Prior Lake, MN (US); Kevin W. Jones, St. Louis Park, MN (US)

(73) Assignee: AT&T Mobility II LLC, Atlanta, GA (US)

( * ) Notice: Subject to any disclaimer, the term of this patent is extended or adjusted under 35 U.S.C. 154(b) by 37 days.

This patent is subject to a terminal disclaimer.

(21) Appl. No.: 13/689,418

(22) Filed: Nov. 29, 2012

(65) Prior Publication Data

US 2013/0137406 A1 May 30, 2013

Related U.S. Application Data

(63) Continuation of application No. 11/781,531, filed on Jul. 23, 2007, now Pat. No. 8,346,206.

(51) Int. Cl.
*H04M 3/42* (2006.01)

(52) U.S. Cl.
USPC ...................................................... 455/414.1

(58) Field of Classification Search
USPC ...................................................... 455/414.1
See application file for complete search history.

(56) References Cited

U.S. PATENT DOCUMENTS

| 6,369,821 | B2 | 4/2002 | Merrill et al. |
| 6,704,576 | B1 | 3/2004 | Brachman et al. |
| 2004/0014456 | A1 | 1/2004 | Vnnen |
| 2005/0286689 | A1 | 12/2005 | Vuori |
| 2006/0258289 | A1 | 11/2006 | Dua |
| 2007/0004459 | A1 | 1/2007 | Aarnio |
| 2007/0047523 | A1 | 3/2007 | Jiang |
| 2007/0171861 | A1 | 7/2007 | Akhtar |
| 2007/0173236 | A1 | 7/2007 | Vishwanathan et al. |
| 2007/0257982 | A1 | 11/2007 | Luo et al. |
| 2007/0294425 | A1 | 12/2007 | Sobti et al. |
| 2008/0151786 | A1* | 6/2008 | Li et al. ................. 370/276 |
| 2008/0280633 | A1 | 11/2008 | Agiv |
| 2010/0138037 | A1 | 6/2010 | Adelberg et al. |
| 2010/0223314 | A1 | 9/2010 | Gadel et al. |

* cited by examiner

*Primary Examiner* — Olumide T Ajibade Akonai
*Assistant Examiner* — Edward Zhang
(74) *Attorney, Agent, or Firm* — Parks IP Law LLC; Mickki D. Murray, Esq.

(57) ABSTRACT

A method for loading a customizable keypress tone package on a desired electronic device includes defining a customizable keypress tone package. The customizable keypress tone package can include one or more customizable keypress tones and can optionally include one or more customizable visual aids. A user requests installation of the defined customizable keypress tone package on the electronic device and the network sends the defined customizable keypress tone package to the electronic device. Once the device receives the package, the device installs the defined customizable keypress tone package on the electronic device.

20 Claims, 8 Drawing Sheets

CUSTOMIZABLE KEYPRESS TONES AND METHOD OF INSTALLING

TECHNICAL FIELD

The present invention relates generally to the field of electronic devices. More particularly, the present invention relates to customizable and interactive keypress tones for mobile communications devices and a method for loading the customizable keypress tone package on mobile communications devices.

BACKGROUND OF THE INVENTION

With the proliferation of mobile communications devices has come an increased demand for new features for mobile communications devices. There is a high demand for mobile communications device features that make the devices more user-friendly, for example, by increasing the ease and accuracy with which common tasks may be performed.

Given the wide use of mobile communications devices in a variety of settings, it is important that features be simple and accurate. For example, hands-free dialing is available for many mobile telephone handsets. This obviates the need to remember telephone numbers and/or to enter commonly-dialed telephone numbers while, for example, driving a motor vehicle.

In general, a mobile communications device (e.g., a mobile telephone) has a keypad. When buttons on the keypad are pressed, the device generates an audio signal. Traditionally, this signal has been a dual-tone multi-frequency signal (hereinafter referred to as a "DTMF tone"). In addition to generating a DTMF tone for dialing purposes, a device may generate a sound to give the user feedback. For example, the device may produce a short click sound to inform the user that a button has been pressed. Often, the feedback provided to the user is the DTMF tone generated for dialing purposes.

While the DTMF tone is easily understood by the telephone networks, humans are not adept at differentiating between the multiple frequency tones generated.

Another common feature of mobile communications devices is a display. The display typically communicates data to a user. The data may include the battery status, various available features and/or menus, contacts, call status, signal strength, combinations thereof, and the like When dialing, text messaging, email, or the like, the display may list the entered characters sequentially so the user can verify that the correct characters have been entered into the device correctly.

SUMMARY OF THE INVENTION

An electronic device can be provided with customizable keypress tones. An electronic device can be, for example, a mobile communications device. The customizable keypress tones may be loaded onto the mobile communications device individually or as a package. Once the customizable keypress tones are loaded, the traditional DTMF tones are replaced with the new keypress tones and an interactive icon may be displayed.

The customizable keypress tones can be made into an interactive keypress tone package, wherein various functions of the mobile communications device may invoke a variety of animations, images, audio, or other functionality. When coupled with the voice recognition ability of some mobile communications devices, the new customizable keypress tone package can give an interactive feel that can give the user the impression that a real conversation is occurring. This conversation-like interaction can make the use of various functions, in particular dialing, more natural, which increases the ease and accuracy of using these functions.

For example, pressing the "2" key on a telephone generally produces a DTMF signal made up of a 1336 Hz signal and a 697 Hz signal. A customizable keypress tone for the "2" key could include, for example, a recording of a real or computer-generated voice saying the word "two," an iconic reference "double," or even a slang reference such as "duce." At the same time, an animation, for example, of a real or computer generated person saying the word "two," or a suitable equivalent, can be prompted by the same single keypress.

Unlike traditional communications devices, a user can customize or select various keypress tones and visual aids to define a customizable keypress tone package. Once a customized set of keypress tones and visual aids are defined as a customizable keypress tone package, the package can be loaded to the mobile communications device after the device is already in use. A customizable keypress tone package can be defined at any time and loaded to the phone remotely or on-demand. The package may be requested by the client, or the package may be sent by the service provider (either at the client's request, or due to other considerations). The package may be automatically loaded onto the device without requiring the client to handle any of the installation steps. More often, however, the client will select or customize a package for installation and then downloading and installation will occur automatically.

Accordingly, an embodiment of the present invention includes a customizable keypress tone package. The customizable keypress tone package can include one or more audio files assigned to a desired device function. The customizable keypress tone package can also include one or more visual media files. The user can assign a desired audio file to a desired device function. The user can also assign a desired visual media file to a desired device function. A device function can therefore be associated with one or more audio files and/or one or more visual media files.

According to another embodiment, the present invention includes a method for loading a customizable keypress tone package on a desired electronic device. A user defines a customizable keypress tone package. The customizable keypress tone package can include one or more customizable keypress tones. Once the customizable keypress tone package is defined, the user can request from the network installation of the defined customizable keypress tone package. After the request is made, the network can send the defined customizable keypress tone package to the electronic device. Once the device receives the defined customizable keypress tone package, the defined customizable keypress tone package can be installed on the electronic device and can then be used by the user.

A computer-readable medium that includes computer-executable instructions can, upon execution, perform the steps of the above method.

These and further features of the present invention will be apparent with reference to the following description and attached drawings.

DESCRIPTION

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
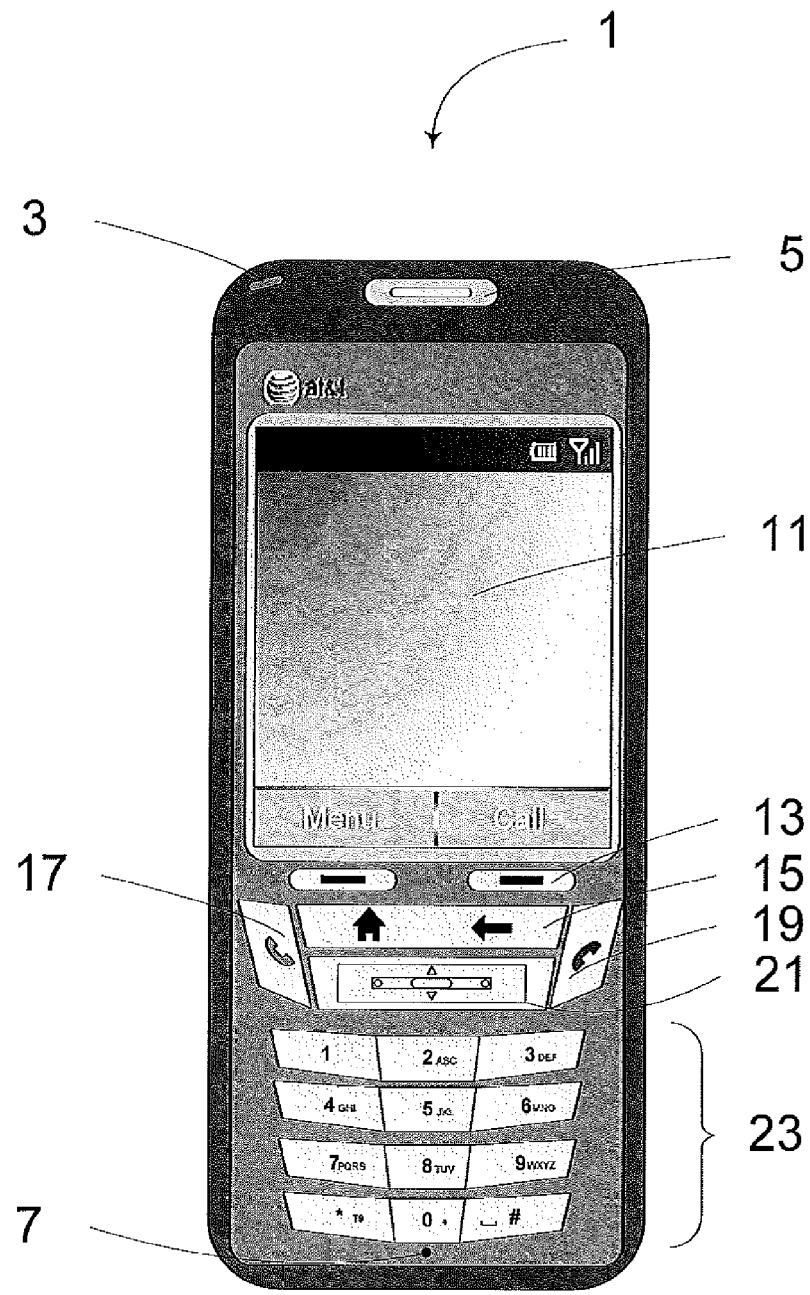
FIG. 1 is a plan view of an exemplary mobile communications device that includes an exemplary embodiment of the present invention.

Referring initially to FIG. 1, an exemplary electronic device 1 is illustrated. The electronic device can be a mobile communications device, for example a personal digital assistant ("PDA"), a handset, a portable computer, combinations thereof, and the like. In the exemplary illustration, the electronic device is a handset. The handset can include an indicator 3. The indicator can be, for example, a light emitting diode (LED) that indicates various status states of the device 1. A mobile communications device 1 generally includes a speaker 5 and a microphone 7. The speaker 5 and the microphone 7 collectively and respectively transmit and collect audio signals. The device 1 includes a display 11 for communicating features and status to the user and for enabling the user to navigate the control system and use various features of the device. The display 11 may also be used to display, for example, photographs, videos, movies, streaming video, GPS information, email, Internet, voice mail options, combinations thereof, and the like. As illustrated, the device 1 can include a plurality of keys, including softkeys 13, function keys 15, an initiate call key 17, and a terminate call key 19. Some devices can also include a toggle switch 21. A toggle switch 21 can allow navigation through various menus and lists and/or can facilitate control of various features of the device. Instead of a toggle switch, some devices include a joy stick, a roller wheel, a rocker switch, or the like. A mobile communications device 1 generally includes an alpha-numeric keypad 23 for inputting numbers and/or letters while interacting with the device.

Figure 2:
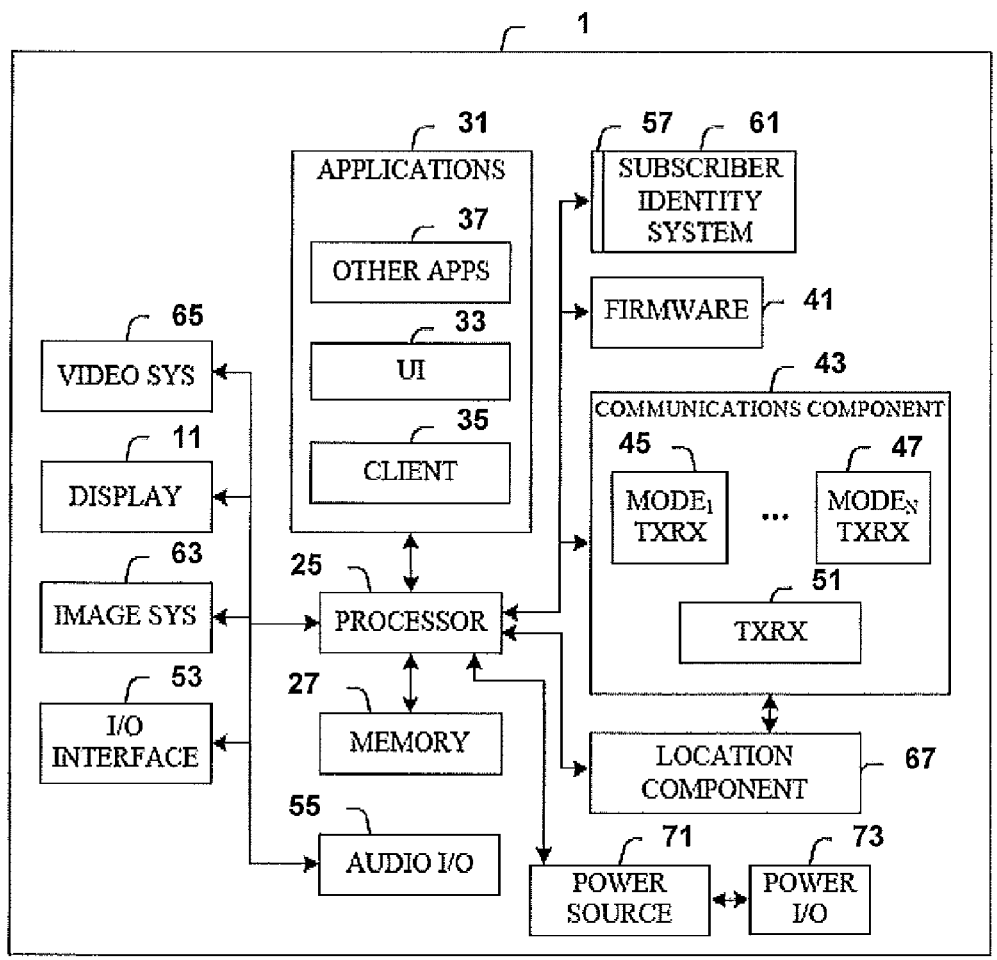
FIG. 2 is a schematic diagram of an exemplary mobile communications device that includes an exemplary embodiment of the present invention.

FIG. 2 illustrates a schematic block diagram of an exemplary mobile communications device 1 for use in accordance with an exemplary embodiment of the present invention. As illustrated, the mobile communications device 1 can be a multimode handset. FIG. 2 and the following discussion are intended to provide a brief, general description of a suitable environment in which the various aspects of an embodiment of the present invention can be implemented. While the description includes a general context of computer-executable instructions, the present invention can also be implemented in combination with other program modules and/or as a combination of hardware and software.

Generally, applications (e.g., program modules) can include routines, programs, components, data structures, combinations thereof, and the like, that perform particular tasks or implement particular abstract data types. Moreover, the inventive methods can be practiced with other system configurations, including single-processor or multiprocessor systems, minicomputers, mainframe computers, as well as personal computers, hand-held computing devices, microprocessor-based or programmable consumer electronics, combinations thereof, and the like, each of which can be operatively coupled to one or more associated devices.

The device 1 can include a variety of computer readable media. Computer readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD ROM, digital video disc (DVD) or other optical disk storage, magnetic tape, magnetic disk storage or other magnetic storage devices, or any other medium that can be used to store the desired information and that can be accessed by the handset systems.

The device 1 includes a processor 25 for controlling and processing onboard operations and functions. A memory 27 interfaces to the processor 25 for the storage of data and one or more applications 31 (e.g., a video player software, user feedback component software, combinations thereof, and the like). The applications 31 can also include a user interface (UI) application 33 that operates with a client 35 (e.g., operating system) to facilitate user interaction with handset functionality and data, for example, answering/initiating calls, entering/deleting data, configuring settings, address book manipulation, multimode interaction, combinations thereof, and the like The applications 31 can include other applications 37 installed with the handset 31 and/or installed as add-ons or plug-ins to the client 35 and/or UI 33, for example, or for other purposes (e.g., processor, firmware, combinations thereof, and the like).

The other applications 37 can include voice recognition of predetermined voice commands that facilitate user control, call voice processing, voice recording, messaging, e-mail processing, video processing, image processing, music play, as well as subsystems or components described infra. Some of the applications 31 can be stored in the memory 27 and/or in a firmware 41, and executed by the processor 25 from either or both the memory 27 or/and the firmware 41. The firmware 41 can also store code for execution in power-up initialization and control during normal operation of the device 1.

A communications component 43 can interface to the processor 25 to facilitate wired/wireless communications with external systems, for example, cellular networks, VoIP (voice-over-IP) networks, local wireless networks or personal wireless networks such as Wi-Fi, Wi-Max, and the like. Here, the communications component 43 can also include a multimode communications subsystem for providing cellular communications via different cellular technologies. For example, a first cellular transceiver 45 (e.g., GSM) can be one mode and an Nth transceiver 47 can provide cellular communications via an Nth cellular network (e.g., UMTS), where N is a positive integer. The communications component 43 can also include a transceiver 51 for unlicensed communications (e.g., Wi Fi, Wi-Max, Bluetooth, combinations thereof, and the like) for corresponding communications. The communications component 43 can also facilitate communications reception from terrestrial radio networks (e.g., broadcast), digital satellite radio networks, and Internet-based radio services networks.

The device 1 can process IP data traffic via the communications component 43 to accommodate IP traffic from an IP network such as, for example, the Internet, a corporate intranet, a home broadband network, a personal area network, combinations thereof, and the like, via an ISP or broadband cable provider. Thus, VoIP traffic can be utilized by the device 1 and IP-based multimedia content can be received in an encoded and/or decoded format.

The device 1 includes a display 11 for displaying multimedia that include text, images, video, telephony functions (e.g., a Caller ID function), setup functions, menus, combinations thereof, and the like. The display 11 can also accommodate the presentation of multimedia content (e.g., music metadata, messages, wallpaper, graphics, combinations thereof, and the like).

An input/output (I/O) interface 53 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, combinations thereof, and the like). The I/O interface 53 can be utilized for updating and/or troubleshooting the device 1, for example.

Audio capabilities can be provided via an audio I/O component 55, which can include a speaker 5 for the output of audio signals related to, for example, indication that the user pressed the proper key or key combination to initiate the user feedback signal, call signals, music, combinations thereof, and the like The audio I/O component 55 also facilitates the input of audio signals via a microphone 7 to record data and/or telephony voice data, and for inputting voice signals for telephone conversations.

The device 1 can include a slot interface 57 for accommodating a subscriber identity system 61 that can accommodate a SIM or universal SIM (USIM), and interfacing the subscriber identity system 61 with the processor 25. However, it is to be appreciated that the subscriber identity system 61 can be manufactured into the device 1, and updated by downloading data and software thereinto.

An image capture and processing system 63 (e.g., a camera) can be provided for decoding encoded image content. Additionally, as indicated, photos can be obtained via an associated image capture subsystem of the image system 63. The device 1 can also include a video component 65 for processing video content received and, for recording and transmitting video content.

Optionally, a geolocation component 67 (e.g., GPS-global positioning system) facilitates receiving geolocation signals (e.g., from satellites via the communications component 43) that define the location of the device 1. Alternatively, or in combination therewith, the geolocation component 67 can facilitate triangulation processing for locating the device 1.

The device 1 also includes a power source 71 in the form of batteries and/or an AC power subsystem. The power source 71 can interface to an external power system or charging equipment (not shown) via a power I/O component 73.

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wire Ethernet networks used in many locations.

Figure 3:
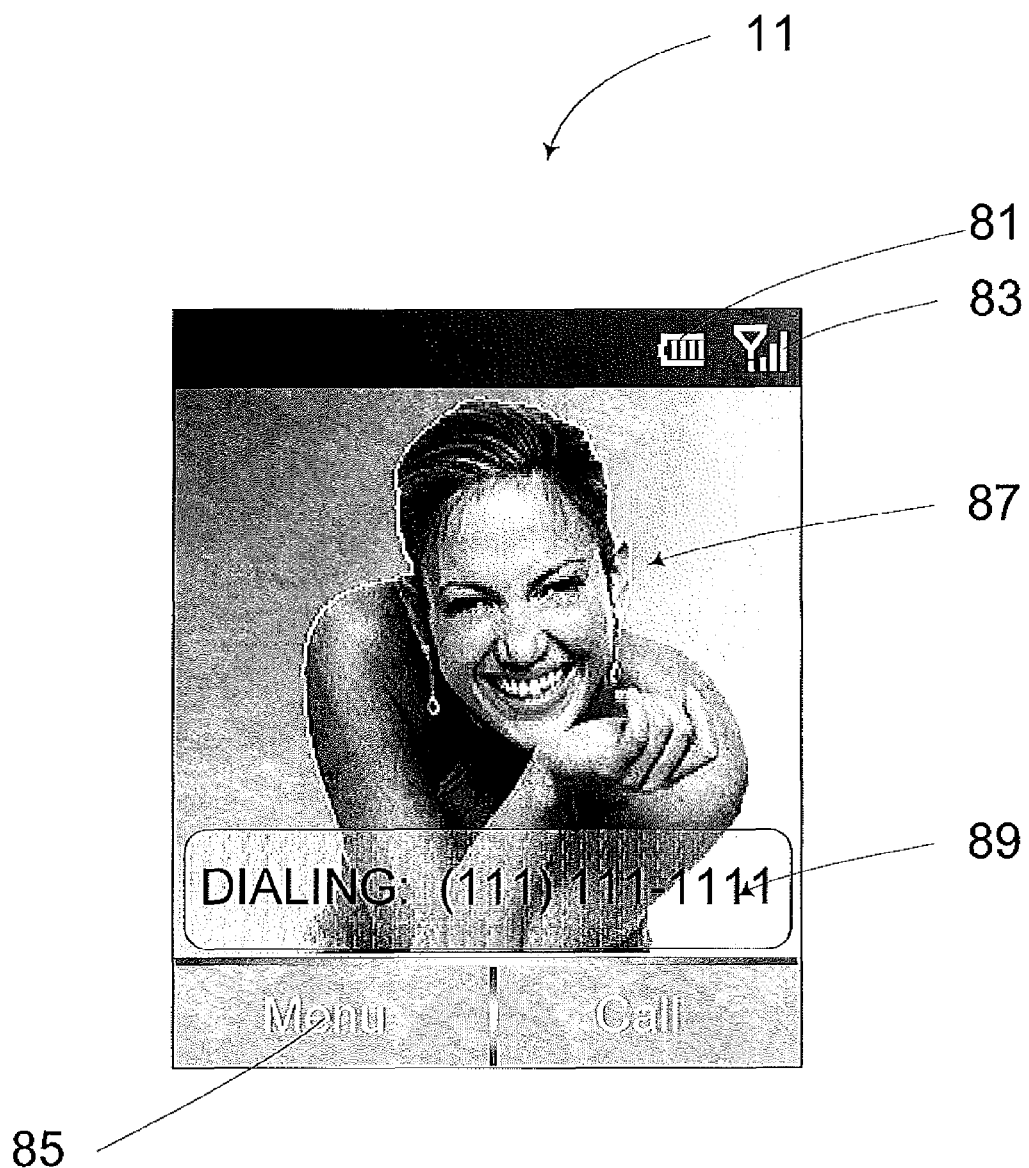
FIG. 3 is a front view of a mobile communications device display employing an exemplary embodiment of the present invention.

Referring now to FIG. 3, the display 11 is described in greater detail. As shown, the display 11 can present various data to the user. In the case of a handset 1, for example, the display 11 can include a battery status indication 81, a signal strength indication 83, one or more customized menu options 85, and/or any other information. When a user enters alphanumeric characters, the display 11 may show each character pressed in sequence so the user can verify that the correct characters have been entered into the device.

As shown, an exemplary embodiment of the present invention includes the ability to modify the display 11 of the device 1. For example, a customizable keypress tone package can include a visual representation 87 of a personality. In the illustrated embodiment, the visual representation 87 is a photograph of a well-known personality. It should be understood that the visual representation 87 could be any visual representation, including, but not limited to, icons, avatars, or even animated inanimate objects (e.g., a talking telephone, combinations thereof, and the like). As keys are pressed, the device 1 can be configured to show animations or videos of the representation (e.g., the personality) making certain movements. At the same time, the device 1 can be configured to make a customizable keypress tone. For example, if the user presses the number "1" on the keypad 23, the device 1 can play an audio recording of the personality saying the word "one" and the device 1 can also play a video recording of the personality saying the word "one." Therefore, when the user presses the number "1," the device 1 can give the impression that the personality just said the word "one." As explained above, the device 1 can play an audio recording of the personality saying an iconic or slang word instead of, in addition to, or in combination with, the word "one." Similarly, the device 1 can play a video recording of the personality saying an iconic or slang word instead of, in addition to, or in combination with, the word "one." At the same time, standard visual feedback 89 can be provided in the form of the digit "1" appearing on the display 11 in another location. In this manner, the device 1 equipped with a customizable keypress tone package can give the user an interactive dialing experience that will enhance dialing not only from an entertainment perspective, but also pertaining to dialing accuracy and ease.

Custom audio and visual aids can be applied to any feature of the device 1. For example, the default splash screen greeting can be replaced with a customized splash screen greeting that is part of the customizable keypress tone package. Additionally, package features can be associated with contact voice tags (new or existing) and dial shortcuts. For example, if a voice tag exists for "home," then when the user uses the device 1 to place a call to a home telephone number, the representation 87 of the personality can appear to say "calling home." Other audio and visual aids can be applied to other functions of the device 1, such as during connection of the call. For example, once the desired number is dialed and the device 1 is directed to connect the call, the device 1 can play a audio recording and video recording of the personality saying, for example, "call me next," or "calling your hottie." In other words, almost any feature or state of the phone can have an associated audio and/or visual aid.

Typically, the customizable keypress tone package will include a customized audio and visual aid for at least each numerical character on the alphanumeric key pad 23. The customizable keypress tone package can be defined by a service provider, a user, or any other entity. The customizable keypress tone packages can be stored either on the network or on the device 11. While some customizable keypress tone packages may be stored in the memory of device 11, it is possible that additional customizable keypess tone packages will be available from the service provider or from outside providers. Additionally or alternatively, a user can create a personalized customizable keypress tone package and upload the package to the network. Prior to accessing such features, the service provider may require an account and or may require certain hardware requirements (e.g., a webcam, a microphone, an audio recorder, combinations thereof, and the like). Once a desired package is created or selected, the desired package can be sent to the device 11 for installation. Once the device receives the customizable keypress tone package, the device can automatically install the contents without the user's involvement.

Figure 4:
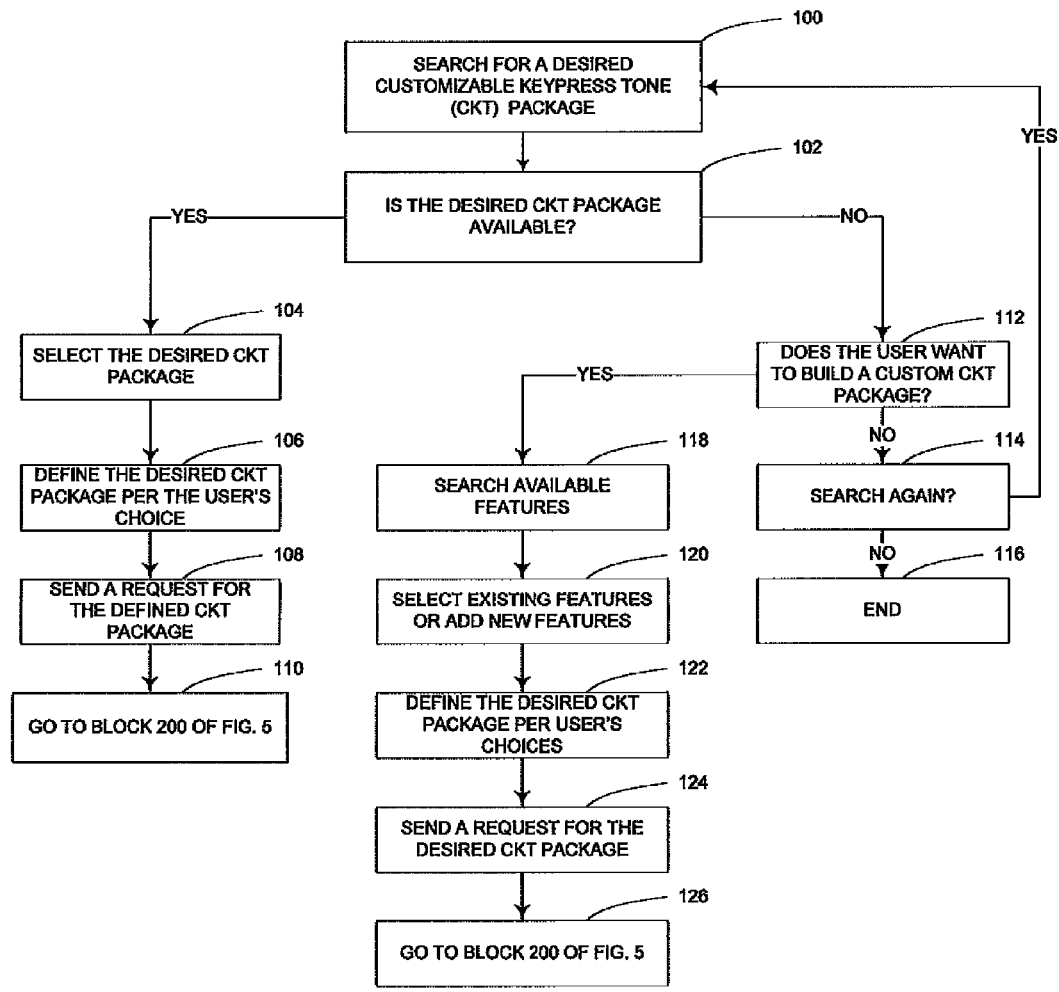
FIG. 4 is a schematic representation of a package request method portion of a customizable keypress tone package installation method according to an exemplary embodiment of the present invention.
Figure 5:
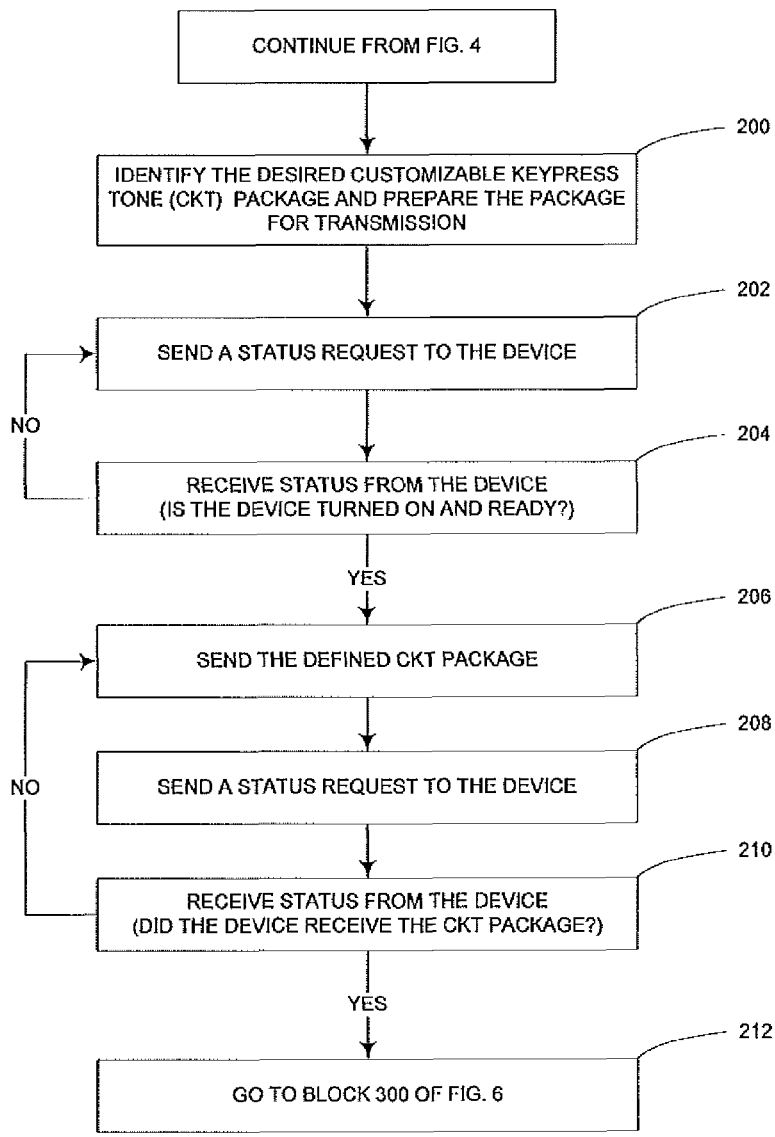
FIG. 5 is a schematic diagram of a package send method portion of a customizable keypress tone package installation method according to an exemplary embodiment of the present invention.
Figure 6:
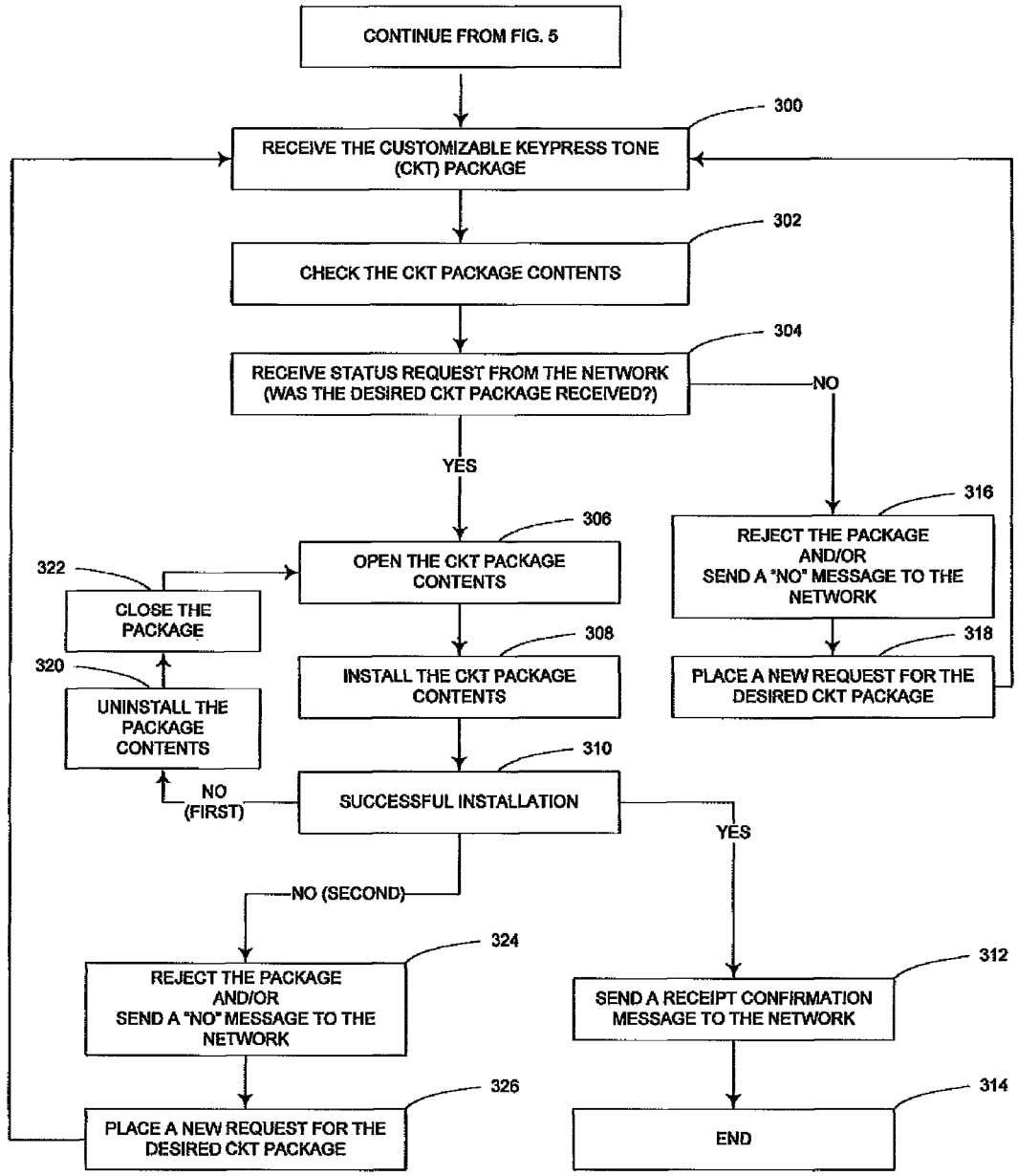
FIG. 6 is a schematic diagram of a package receive method portion of a customizable keypress tone package installation method according to an exemplary embodiment of the present invention.

Referring now to FIGS. 4-6, a method for defining, sending, receiving, and loading a customizable keypress tone package is schematically illustrated. It should be understood that the illustrated and described method is exemplary only. The steps described are not presented in a required order and performance of the steps in an alternative order(s) is possible and contemplated. The steps have been presented in the demonstrated order merely for ease of description and illustration. Steps can be added, omitted and/or performed simultaneously without departing from the scope of the claims. Furthermore, although the process has been divided into three portions (illustrated in three different figures), the process is substantially continuous. For the purposes of teaching, and not limitation, the process has been divided into convenient divisions as follows: FIG. 4 represents the portion of the process that can be performed by a user or a user's device. FIG. 5 represents the portion of the process that can be performed by the network or a network operator. FIG. 6 represents the portion of the process that can be performed by the user's device. These and further details will become clear upon reading further.

Referring initially to FIG. 4, a package request method portion of a customizable keypress tone package installation method according to an exemplary embodiment of the present invention is schematically illustrated. Beginning at block 100, a user searches for a customizable keypress tone package. The search can be initiated on the device (e.g., a handset), or can be conducted from, for example, a terminal connected to the Internet. The customizable keypress tone package may exist, for example, as an entry in a customizable keypress tone package database that is stored on a server. The database can be made accessible to Internet users or can be accessed directly from the device. As illustrated at block 102, the user may search through the available keypress tone packages for a desired package. If a desired keypress tone package is available, the user can make a decision at block 104, whereat the user selects a desired customizable keypress tone package (the "package"). At block 106, the selected package is defined as the desired package. In block 108, the user sends a request for the defined package, in effect placing an order. The user may be billed during the transaction or may receive a bill later. If the billing occurs during the transaction, then the billing transaction could occur at any time including between blocks 108 and 110. As illustrated in block 110, after the request has been sent, and/or after the billing information is entered, the request program portion of the process ends and the process proceeds to block 200 of FIG. 5.

Returning to block 102, if the user did not find the desired package at block 102, then the process proceeds to block 112, at which the user decides whether to make a custom package outside of the packages available from the database. If the user decides not to create a custom package, then the method proceeds to block 114 whereat the user will decide whether or not to search again for the desired package. If the user decides to search again, then the process returns to block 100 and the user searches the database again. If the user decides not to build a customized package, the process ends at block 116. If the user decides to build a customized package, the process proceeds to block 118. In block 118, the user can search for available features, which are subunits of a customizable keypress tone package. A "feature" in this context refers to, for example, a specific tone, a tone package, an icon, a font, a photograph, an animation, an image, combinations thereof, or the like. By creating a custom package, a user can select features from various packages and put them together into a custom grouping. During this search, the features can be listed individually or in smaller sub-packages that include several features. If the user does not find any desired features during this search, the user may add custom features (e.g., custom voice recordings, pictures, combinations thereof, and the like). The custom features may be created at any time and can be uploaded to the system. Whether the features preexist in the database or are added by the user, the desired features are selected in block 120. At block 122, the desired features are grouped together and collectively defined as a desired customizable keypress tone package. Various operations may be performed on the customized keypress tone package, including compression, file-format conversion, audio leveling, combinations thereof, and the like. The user then sends a request for the desired package at block 124. The request procedure is then completed at block 126 and the process proceeds to block 200 of FIG. 5.

Referring now to FIG. 5, a package send method portion of a customizable keypress tone package installation method according to an exemplary embodiment of the present invention is schematically illustrated. This portion of the process is a continuation of the portion illustrated in FIG. 4. At block 200, the network identifies the desired customizable keypress tone package as defined by the user's request and prepares the package for transmission. This preparation step may include compiling the data into one convenient package, compressing files, and/or moving data from one database to another to consolidate the package into one convenient package, combinations thereof, and the like. Alternatively, the package may already exist as one convenient data package, so this step may only consist of moving the data to an area of the network that can send the package to the user. Alternatively, this step may be omitted in its entirety though this step occurs in the illustrated exemplary embodiment.

At block 202, the network determines whether the device is ready to receive data. In the illustrated embodiment, the network sends a status request to the device, e.g. a handset. At block 204, the handset responds to the network indicating that it is turned on and ready to receive data. If the network does not receive a reply, the process returns to block 202, a preset wait time is defined and spent, and the status request message is sent again to the device. Alternatively, blocks 202 and 204 may be performed in one step, wherein the network obtains the status of the device by checking the network for connected devices. In yet another alternative, the network can attempt to send the data without knowing the status of the device (effectively bypassing blocks 202 and 204). If the network is configured to behave this way, then in the event that the user's device is turned off or is not ready to receive data, the data transmission will not complete. Therefore, the network can be configured to store the data and try to complete the transfer again later or may leave a message for the device to download the data the next time the device is turned on or enters a network in which data transmission can occur. Regardless of the steps used with reference to blocks 202 and 204, the customizable keypress tone package is transferred to the device at block 206.

After the data has been sent to the device, the network can send a status request to the device at block 208. The status request will effectively ask the device if it received the customizable keypress tone package sent in block 206. The device will respond and the network will receive the status from the device in block 210. Alternatively, the network may send the data in block 206 and wait to hear from the device (without sending the second status request). After a short pre-defined period of time has passed without hearing from the device, or if the device replies that it did not receive the entire package, the process returns to block 206 and the package send and receipt confirmation steps are repeated. As illustrated at block 212, after the device replies that it has received the package, the process proceeds to block 300 of FIG. 6. However, as mentioned above and as will be further understood below, FIGS. 4-6 may occur substantially simultaneously, so block 312 of FIG. 6 may actually precede block 210 of FIG. 5.

Referring now to FIG. 6, a package receive method portion of a customizable keypress tone package installation method according to an exemplary embodiment of the present invention is schematically illustrated. At block 300, the device receives the transferred customizable keypress tone package that was sent in block 206 of FIG. 5. After the package is received, the package and/or the package contents are checked in block 302. The package contents may be verified by the device (e.g., by software that compares the selected package to the received package), or by a user through any form of interface (e.g., showing the name of the received package and waiting for confirmation that the received package matches the selected desired package). While it may be preferable in certain circumstances to avoid user interaction (allowing full automation of the process), the contents of the package are verified and an entry is made wherein the device stores an entry denoting whether the correct package was sent to the device. At block 304, the device may receive a status request from the network corresponding to the status request sent in block 208 of FIG. 5. If the correct package was sent to the device, the process proceeds to block 306, whereat the device opens the package contents. At block 308, the package contents are installed onto the device. At block 310, the device determines whether the installation process was successfully completed. If yes, the device continues to block 312, whereat the device sends a receipt confirmation message to the network corresponding to the status message received by the network in block 210 of FIG. 5. Then, the process ends at block 314.

Returning now to block 304, if the device determines that the wrong package was sent by the network, the device will reject the package (as shown in block 316). As illustrated at block 316, the device may reply to the status request received at block 304 with a "no" message, indicating that the package was not sent. After the "no" message or the rejection occurs in block 316, the process proceeds to block 318, at which the device sends a new request to the network for the desired package. It should be understood that block 316 or block 318 could be omitted. If block 316 is omitted, then the device may enter a new request without rejecting the package or sending a "no" message. If block 318 is omitted, then the device could send a "no" message. Then, as illustrated at block 210 of FIG. 5, the network will return to bock 206 and resend the defined package to the device (and the device will return to block 300 as illustrated in FIG. 6). If a new request is sent in block 318, the request will be processed as described in FIG. 5, and the process with regard to the mobile communications device will return to block 300, whereat the device is waiting for the network to send the new customizable keypress tone package.

Returning now to block 310, whereat the device determines whether the installation of the customizable keypress tone package was successful. If the device determines that the installation was not successful, there are two options, depending upon at which iteration of the process the installation failure occurred. The first time the installation of the package is unsuccessful, the package contents will be uninstalled as illustrated at block 320. Then, the first received package contents will be closed as illustrated at block 322. Then, the process will return to block 306, whereat the package is re-opened. It should be understood that the steps illustrated in blocks 320 and 322 are not necessary and the data could simply be overwritten with the new package. Hence, block 320, block 322, or both could be omitted. Furthermore, the order of blocks 320 and 322 could easily be reversed without affecting the process.

Once the package is reopened, the device attempts to install the package contents a second time as illustrated at block 308. If the device is again unsuccessful, then the process proceeds to block 324, whereat the device rejects the package and/or sends a "no" message to the network in a manner similar to block 316. Then, the device can send a new request for the desired package at block 326 and return to block 300, whereat the device waits for the desired customizable keypress tone package. As discussed above with respect to blocks 316 and 318, blocks 322 and 324 may be omitted and can correspond to certain blocks in FIG. 5. In understanding blocks 322 and 324, please refer to block 316 and 318 and understand that the same relationships exist between the two pairs of blocks (316, 318 & 324, 326). As such, the network will return to block 206 of FIG. 5 and the device will return to block 300. It should be understood that device can be configured to undergo more or less than two iterations prior to sending the "no" message or rejecting the package in block 324.

The following portion of the description is included for any readers who are not readily familiar with a typical exemplary telecommunications network.

Figure 7:
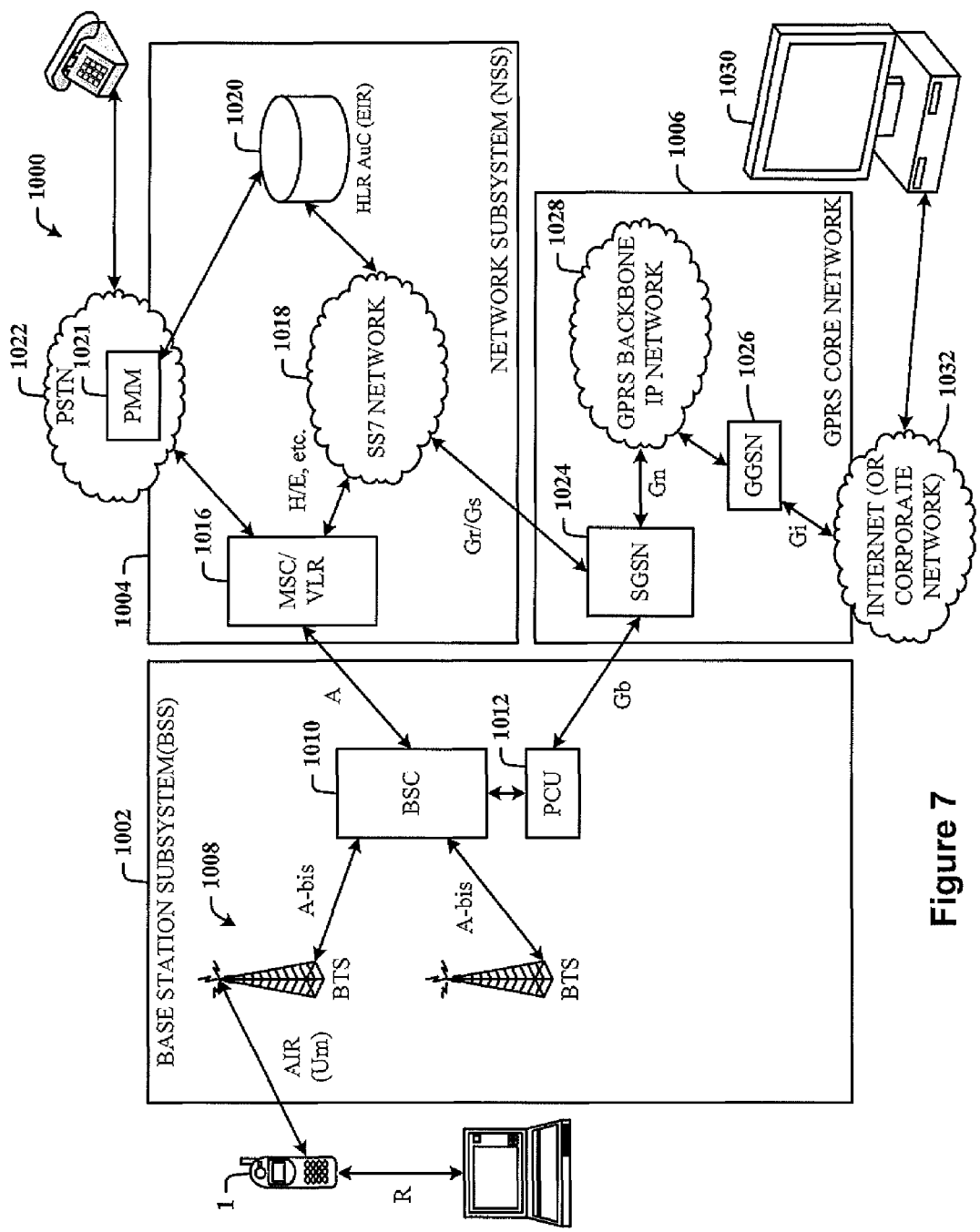
FIG. 7 is a schematic diagram of an exemplary telecommunications network.

FIG. 7 illustrates an exemplary telecommunications network 1000 in which the present invention can be employed. In the illustrated embodiment, the telecommunications network 1000 is a GSM network. The GSM network 1000, designed as a 2G cellular communications system, utilizes time division multiple access (TDMA) technology to enable greater call capacity. Digitally-encoded speech can also be ciphered to retain call privacy. Voice calls are the primary function of the GSM system. To achieve this, the speech is digitally encoded, and later decoded using a vocoder.

GSM also supports a variety of other data services (e.g., facsimile videotext and teletext). One data service includes SMS that allows bi-directional messaging, store-and-forward delivery, and alphanumeric messages. The overall system definition for GSM describes not only the air interface, but also the network. GSM uses 200 KHz RF channels, and are typically multiplexed to, for example, enable eight users to access each carrier.

The GSM network 1000 includes a base station subsystem (BSS) 1002, a network subsystem (NSS) 1004 and a GPRS core network 1006. The BSS 1002 can include one or more base transceiver stations (BTS) 1008 and a base station controller (BSC) 1010 connected together on an A-bis interface. The BTS and accompanying base stations (not shown) connect a cell phone to a cellular network. Base stations are all interconnected to facilitate roaming from one cell to another via a process called handover, without losing the cell connection.

A packet control unit (PCU) 1012 is shown connected to the BTS 1010 although the exact position of this can depend on the vendor architecture. The BSS 1002 is connected by the air interface Um to a mobile terminal 1014. The BTS 1008 are the actual transmitters and receivers of radio signals. Typically, a BTS for anything other than a picocell will have several different transceivers (TRXs) which allow it to serve several different frequencies or even several different cells (in the case of sectorized base stations).

By using directional antennae on a base station, each pointing in different directions, it is possible to sectorize the base station so that several different cells are served from the same location. This increases the traffic capacity of the base station (each frequency can carry eight voice channels) while not greatly increasing the interference caused to neighboring cells (in any given direction, only a small number of frequencies are being broadcast).

The BSC 1010 provides the intelligence behind the BTS 1008. Typically, a BSC can have tens or even hundreds of BTS's 1008 under its control. The BSC 1010 handles allocation of radio channels, receives measurements from the mobile phones, and controls handovers from BTS to BTS (except in the case of an inter-MSC handover in which case control is in part the responsibility of the an MSC). One function of the BSC 1010 is to act as a concentrator such that many different low capacity connections to the BTS 1008 can become reduced to a smaller number of connections towards the MSC. Generally, this means that networks are often structured to have many BSCs 1010 distributed into regions near the BTS 1008 which are then connected to large centralized MSC sites.

The PCU 1012 can perform some of the equivalent tasks of the BSC 1010. The allocation of channels between voice and data can be controlled by the base station, but once a channel is allocated to the PCU 1012, the PCU 1012 takes full control over that channel. The PCU 1012 can be built into the base station, built into the BSC, or even in some architecture, it can be at an SGSN site.

The BSS 1002 connects to the NSS 1004 by an A interface. The NSS 1004 is shown containing an MSC 1016 connected via an SS7 network 1018 to an HLR 1020. The AuC and the EIR, although technically separate functions from the HLR 1020, are shown together since combining them can be performed in the network. The HLR 1020 can interface to a preliminary mobility management (PMM) component 1021 that facilitates pre-mobility analysis in accordance with the disclosed architecture.

The combination of a mobile communications device 1 and a SIM card (not shown) creates a special digital "signature" that includes a subscriber number which is sent from the device 1 to the nearest BTS 1008 asking that the subscriber of a particular network be allowed to use the network. The request is passed on along the network of BTS 1008 to the heart of a cellular network, the MSC 1016. The MSC also routes all incoming and outgoing calls to and from the fixed-line networks or other cellular networks. When the user wants to make an outgoing call, another section of the MSC called the VLR checks whether the caller is actually allowed to make that call. For example, if the caller is barred for international dialing, a message to that effect will be generated by the VLR, sent along the network, and almost instantly back to the cell phone.

The NSS 1004 also contains the component called HLR 1020 that provides the administrative information required to authenticate, register and locate the caller as that network's subscriber. Once the HLR 1020 has received a log-on request, the HLR 1020 immediately checks the special "signature" contained in the request against the HLR special subscriber database. If the subscription is current, the MSC 1016 sends a message back to the phone via the network of BTS 1008 that indicates the caller is allowed to access the network. The name or code of that network can appear on the display 11 of the device 1. Once this network "name" message appears on the display 11, it means the caller is connected to the network 1000 and able to make and receive calls.

The HLR 1020 registers which MSC the device 1 is currently connected to, so that when the network MSC 1016 needs to route an incoming call to the device phone number, it will first check the HLR 1020 to see which MSC is currently serving the device 1. Periodically, the device 1 will send a message to the MSC indicating where it is, in a process called polling. The combination of the tracking function and the caller's unique digital signature allows the MSC 1016 to route that call to the precise base station the cell phone happens to be connected to, and then exclusively to the device 1, even if a number of other subscribers are simultaneously connected to that base station.

When traveling to another MSC coverage area while driving, for example, the HLR 1020 is automatically updated, and continues to monitor where exactly it should route the calls should the caller then move within range of another base station. This routing procedure means that out of hundreds of thousands of subscribers, only the correct cell phone will ring when necessary.

The NSS 1004 has a direct connection to the PSTN (public switched telephone network) 1022 from the MSC 1016. There is also a connection to and from the NSS 1004 to the GPRS core network 1006 via a Gr/Gs interface although this is optional and not always implemented. The illustrated GPRS Core Network 1006 is simplified to include a SGSN 1024 (connected to the BSS 1002 by the Gb interface) and a GGSN 1026. The SGSN 1024 and the GGSN 1026 are connected together by a private IP network 1028 called a GPRS backbone shown as the Gn reference point. A computer 1030 is depicted as connecting to the core network 1006 via an Internet or corporate network 1032. Some voice mail systems are linked to a network SMS Center (SMSC), a special facility that handles short messages. The SMSC generates the special SMS message that notifies the caller when they have mail waiting in a Mailbox. SMS messages can be received on an SMS-capable cell phone even while the caller is on a voice call. This is because the SMS messages are sent on a different radio frequency, the GSM data channel, than voice calls, so that the two never interfere.

Although applicable to any existing or yet to be developed wireless telecommunications network, aspects of the disclosed architecture have been described with reference to the GSM air interface that uses general packet radio service (CPRS) as an enabling bearer. As indicated above, examples of other suitable wireless and radio frequency data transmission systems include networks utilizing TDMA, frequency division multiple access (FDMA), wideband code division multiple access (WCDMA), orthogonal frequency division multiplexing (OFDM), and various other 2.5 and 3G (third generation) and above wireless communications systems. Examples of other suitable enabling bearers include universal mobile telecommunications system (UMTS), enhanced data rates for global evolution (EDGE), high speed downlink packet access (HSDPA), and similar communications protocols.

Figure 8:
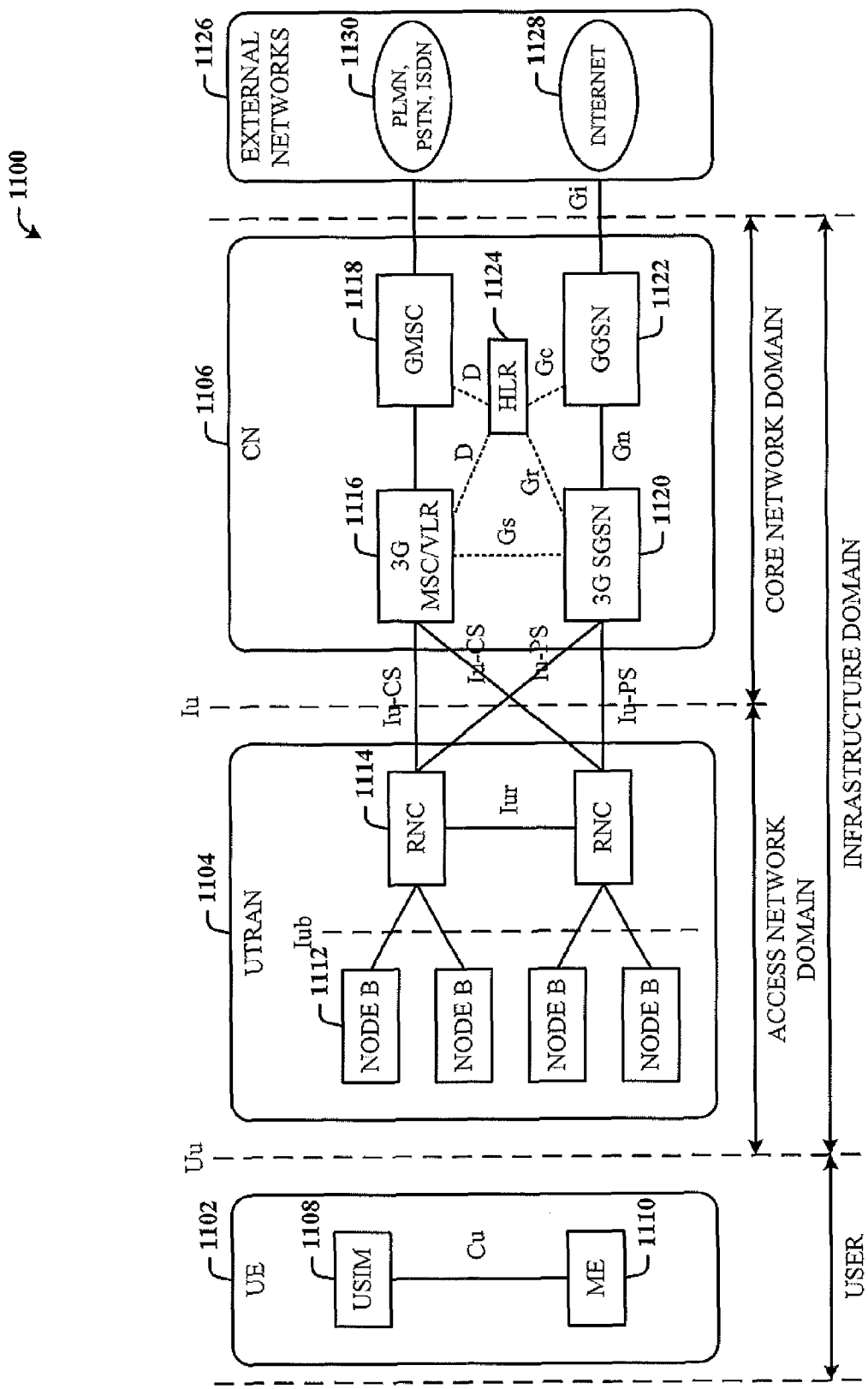
FIG. 8 is a schematic diagram of an exemplary UTMS network.

FIG. 8 illustrates an exemplary UMTS network 1100 that facilitates pre-mobility management analysis in call communications. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the innovative aspects described herein can also be applied to other frequency bands. UMTS can be used in other cellular/PCS frequencies, for example, 825-849 MHz and 869-894 MHz, 1850-1910 MHz and 1930-1990 MHz. Bearer services can have different QoS (quality-of-service) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 1100 can consist of three interacting domains; a user equipment (UE) domain 1102, a UMTS Terrestrial Radio Access Network (UTRAN) domain 1104, and a core network (CN) domain 1106. The UTRAN domain 1104 is also referred to as the access network domain and the CN 1106 is referred to as the core network domain, the both of which comprise an infrastructure domain.

The UE domain 1102 includes a USIM (user services identity module) domain and an ME (mobile equipment) domain. User equipment is the equipment used by the user to access UMTS services. In the UE domain 1102, the UMTS IC card is the USIM 1108 which has the same physical characteristics as GSM SIM (subscriber identity module) card. The USIM interfaces to ME 1110 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 1104 provides the air interface access method for the UE domain 1102. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 1112, and control equipment for Node-B devices is called a radio network controller (RNC) 1114. The interface between the Node-B device and the RNC 1114 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a MSC/VLR 1116, and GMSC 1118. Packet-switched elements include a serving GPRS support node (SGSN) 1120 and gateway GPRS support node (GGSN) 1122. Some network elements such as an EIR (equipment identity register) (not shown), HLR (home location register) 1124, VLR and AuC (authentication center) (not shown) can be shared by both domains.

A function of the CN 1102 is to provide switching, routing and transit for user traffic. The CN 1102 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 1106 interfaces to the radio access domain via an Iu interface. An Iu-CS (circuit-switched) reference point interfaces an RNC of the access network to the MSCNLR entity 1116 of the CN 1106 for voice from/to the MSCNLR 1116. An Iu-PS (packet-switched) reference point interfaces an RNC of the access network to the SGSN entity 1120 of the CN 1106 for data from/to the SGSN 1120.

In the CN 1106, a Gs interface is provided between the MSCNLR 1116 and the SGSN. A Gn interface is provided between the SGSN 1120 and the GGSN 1122. A D interface is provided between the MSCNLR 1116 and the HLR 1124, and the HLR 1124 and the GMSC 1118. A Gr interface is provided between the SGSN 1120 and the HLR 1124. A Gc interface is provided between the GGSN 1122 and the HLR 1124.

The CN 1106 provides the interface from the UE domain 1102 to external networks 1126 such as the Internet 1128 via a Gi interface from the GGSN 1122, and other networks 1130 via the GMSC 1118, which can include a PLMN (public land mobile network), PSTN and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 1106 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSCNLR and SGSN can merge to become a UMTS MSC.

Paired uplink and downlink channel spacing can be 5 MHz and raster is 200 kHz. An operator can use 3-4 channels (2×15 MHz or 2×20 MHz) to build a high-speed, high-capacity network. Frequencies 1900-1920 MHz and 2010-2025 MHz can be utilized for TDD and TD/CDMA. Unpaired channel spacing can be 5 MHz and raster is 200 kHz. Transmit and receive are not separated in frequency. Frequencies such as 1980-2010 MHz and 2170-2200 MHz can be employed for satellite uplink and downlink.

The disclosed invention finds application to EDGE (Enhanced Data rates for GSM Evolution) technology. EDGE uses a new modulation schema to enable theoretical data speeds of up to 384 Kbps within the existing GSM spectrum. EDGE is an alternative upgrade path towards 3G services for operators, without access to a new spectrum.

The architecture of the invention can also be applied to a hierarchical cell structure (HCS). HCS is the architecture of a multi-layered cellular network where subscribers are handed over from a macrocell to a microcell, and even further, to a picocell, depending on the current network capacity and the needs of the subscriber.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A system comprising:
a processor; and
a tangible computer-readable storage device being in communication with the processor and having stored thereon a customizable media feedback software package that at least:
  includes an audio media file that (a) is assigned to a device function associated with making a communication including initiating a call and (b) includes pre-programmed audio media including a voice saying at least one word corresponding to a single input to be provided to the communication device by the user to initiate the function associated with making the call;
  includes a visual media file, distinct from the audio file, that (a) is assigned to the device function including initiating the call and (b) includes pre-programmed visual media including a video of an actual person or animated person or character saying the at least one word corresponding to the single input to be provided to the communication device by the user to initiate the function associated with making the call; and
  when executed by the processor, causes the processor to perform operations comprising:
    receiving the single input from a user of the communication device to initiate the call; and
    delivering, in response to receiving the single input from the user to initiate the call, to the user of the communication device:
      the audio media, of the audio media file, including the voice saying the at least one word corresponding to the single input provided by the user to the communication device; and
      the visual media, of the visual media file, including the video of the actual person or animated person or character saying the at least one word corresponding to the single input provided by the user to the communication device.

2. The system of claim 1, wherein the customizable media feedback software package comprises a plurality of audio media files, including the audio media file, associated with a plurality of device functions, including the device function, and includes a plurality of visual media files, including the visual media file, associated with the plurality of device functions.

3. The system of claim 1, wherein:
the single input provided by the user includes a certain voice input, from the user, to the communication device; and
the operation of delivering comprises delivering, to the user of the communication device, the audio media corresponding to the audio media file and the visual media corresponding to the visual media file in response to the user providing the certain voice input to the communication device.

4. The system of claim 1, wherein:
the single input provided by the user includes a keyed input to the communication device; and
the operation of delivering comprises delivering, to the user of the communication device, the audio media corresponding to the audio media file and the visual media corresponding to the visual media file in response to the user providing the keyed input to the communication device.

5. The system of claim 4, wherein the operations further comprise delivering to the user the audio media corresponding to the audio media file and visual media corresponding to the visual media file instead of the communication device delivering a dual-tone multi-frequency signal to the user via the communication device in response to the user pressing the key of the communication device.

6. The system of claim 1, wherein the audio media file and the visual media file are associated with a specific party to be called.

7. The system of claim 6, wherein the operation of delivering comprises delivering, to the user, the audio media and the visual media specific to the party to be called in response to the user initiating the call to the party to be called.

8. A system, for use in a communications network, comprising:
a network processor; and
a tangible computer-readable storage device being in communication with the network processor and having stored thereon computer-executable instructions that, when executed by the network processor, cause the network processor to perform network operations, for providing a customizable media feedback software package to a communication device associated with a user for being stored on a computer-readable medium of the communication device, comprising:
generating the customizable media feedback software package, wherein the customizable media feedback software package comprises:
an audio media file that (a) is assigned to a function of the communication device associated with making a communication including initiating a call and (b) includes pre-programmed audio media including a voice saying at least one word corresponding to a single input to be provided to the communication device by the user to initiate the function associated with making the call; and
a visual media file, distinct from the audio file, that is (a) assigned to the device function associated with making the communication including initiating the call and (b) includes pre-programmed visual media including a video of an actual person or animated person or character saying the at least one word corresponding to the single input to be provided to the communication device by the user to initiate the function associated with making the call;
wherein the software package, when executed by a mobile device processor, causes the mobile device processor to perform device operations comprising delivering, in response to receiving the single input provided by the user to the communication device, to the user of the communication device:
the audio media, of the audio media file, including the voice saying the at least one word corresponding to the single input provided by the user to the communication device; and
the visual media, of the visual media file including the video of the actual person or animated person or character saying the at least one word corresponding to the single input provided by the user to the communication device; and
sending, from the network, to the communication device, the customizable media feedback software package generated for installation to the communication device.

9. The system of claim 8, wherein the operation of generating comprises selecting an existing customizable media feedback software package.

10. The system of claim 8, wherein the operation of generating comprises creating the customizable media feedback software package.

11. The system of claim 8, wherein the network operations further comprise:
receiving, from the communication device, a request for installation of the generated customizable media feedback software package generated; and
the generating network operation and the sending network operation are performed in response to the request.

12. The system of claim 8, wherein the device operations further comprise installing, to the communication device, the customizable media feedback software package generated.

13. The system of claim 8, wherein:
the single input provided by the user includes a keyed input to the communication device; and
the device operation of delivering comprises delivering, to the user of the communication device, the audio media corresponding to the audio media file and the visual media corresponding to the visual media file in response to the user providing the keyed input to the communication device.

14. The system of claim 8, wherein:
the single input provided by the user includes a certain voice input, from the user, to the communication device; and
the device operation of delivering comprises delivering, to the user of the communication device, the audio media corresponding to the audio media file and the visual media corresponding to the visual media file in response to the user providing the certain voice input to the communication device.

15. A system comprising:
a processor; and
a tangible computer-readable storage device being in communication with the processor and having stored thereon computer-executable instructions that, when executed by the processor, cause the processor to perform loading operations, for loading a customizable media feedback software package on a communication device, comprising:
requesting, of a network system, installation of the customizable media feedback software package, wherein the customizable media feedback software package includes:
an audio media file that (a) is assigned to a function of the communication device associated with making a communication including initiating a call and (b) includes pre-programmed audio media including a voice saying at least one word corresponding to a single input to be provided to the communication device by a user to initiate the function associated with making the call; and a visual media file, distinct from the audio file, that (a) is assigned to the device function associated with making the communication including initiating the call and (b) includes pre-programmed visual media including a video of an actual person or animated person or character saying the at least one word corresponding to the single input to be provided to the communication device by the user to initiate the function associated with making the call;

wherein the software package, when executed by the processor, causes the processor to perform, in response to receiving the single input provided by the user to the communication device, function operations comprising delivering, to the user of the communication device at least:

the audio media, of the audio media file, including the voice saying the at least one word corresponding to the single input provided by the user to the communication device; and the visual media, of the visual media file including the video of the actual person or animated person or character saying the at least one word corresponding to the single input provided by the user to the communication device.

16. The system of claim 15, wherein the loading operations further comprise receiving the customizable media feedback software package.

17. The system of claim 16, wherein the loading operations further comprise installing, to the communication device, the customizable media feedback software package received.

18. The system of claim 15, wherein the loading operation of requesting the customizable media feedback software package comprises requesting an existing customizable media feedback software package.

19. The system of claim 15, wherein:

the single input provided by the user includes a keyed input to the communication device; and the function operation of delivering comprises delivering, to the user of the communication device, the audio media corresponding to the audio media file and the visual media corresponding to the visual media file in response to the user providing the keyed input to the communication device.

20. The system of claim 15, wherein:

the single input provided by the user includes a certain voice input, from the user, to the communication device; and the function operation of delivering comprises delivering, to the user of the communication device, the audio media corresponding to the audio media file and the visual media corresponding to the visual media file in response to the user providing the certain voice input to the communication device.

* * * * *